United States Patent
Viikari et al.

(10) Patent No.: US 6,425,975 B1
(45) Date of Patent: Jul. 30, 2002

(54) PROCESS FOR CONCENTRATING SOLUBLE AND COLLOIDAL SUBSTANCES IN PROCESS WATERS

(75) Inventors: Liisa Viikari, Helsinki; Annikka Mustranta; Leena Fagernäs, both of Espoo, all of (FI)

(73) Assignee: Valtion teknillinen tutkimuskeskus, Vuorimiehentie (FI)

(*) Notice: Subject to any disclaimer, the term of this patent is extended or adjusted under 35 U.S.C. 154(b) by 0 days.

(21) Appl. No.: 09/743,635
(22) PCT Filed: Jul. 13, 1999
(86) PCT No.: PCT/FI99/00624
§ 371 (c)(1), (2), (4) Date: Mar. 14, 2001
(87) PCT Pub. No.: WO00/03083
PCT Pub. Date: Jan. 20, 2000

(30) Foreign Application Priority Data

Jul. 13, 1998 (FI) .................................................. 981602

(51) Int. Cl.⁷ .............................................. D21C 11/00
(52) U.S. Cl. ........................... 162/29; 162/72; 210/606; 426/53; 435/275
(58) Field of Search ........................... 162/29, 72, 189; 210/606, 601, 631, 750; 435/272, 275, 274

(56) References Cited

U.S. PATENT DOCUMENTS

| 4,233,406 A | * 11/1980 | Wieg et al. .................. 435/275 |
| 5,246,542 A | 9/1993 | Fosberg et al. ................ 162/29 |
| 5,415,735 A | 5/1995 | Thornton et al. ............. 162/72 |

FOREIGN PATENT DOCUMENTS

| DE | 4000558 | 7/1990 |
| DE | A1-4000558 | 7/1990 |
| WO | A1-9216687 | 10/1992 |

* cited by examiner

Primary Examiner—Dean T. Nguyen
(74) Attorney, Agent, or Firm—Birch, Stewart, Kolasch & Birch, LLP

(57) ABSTRACT

The invention relates to a process for enhancing the concentration of the fiber derived dissolved and colloidal substances in process water that comes from mechanical pulping. According to the invention, process water is treated with enzyme preparations that have an effect on carbohydrates and that contain mannanase and/or endoglucanase, in particular, which break down the soluble carbohydrate polymers contained by the process water into low molecular weight oligosaccharides. The treatment prevents an increase in viscosity so that process water can be concentrated into a high dry content, or the treatment can be used to lower the viscosity of previously concentrated process water to facilitate after-treatment.

20 Claims, 7 Drawing Sheets

PROCESS FOR CONCENTRATING SOLUBLE AND COLLOIDAL SUBSTANCES IN PROCESS WATERS

FIELD OF THE INVENTION

The present invention relates to a process for concentrating the fiber derived dissolved and colloidal substances of recyclable process waters that come from mechanical pulping.

During mechanical pulping, fiber derived dissolved and colloidal substances (DCS) are released from wood into the process water, the quantity and the composition of the substances depending on the wood raw material and method used. A considerably larger amount of DCS is dissolved from refiner mechanical pulp than from groundwood, but the composition of the DCS in each is almost the same. Two to five % of wood material is released into the process water in mechanical pulping and the subsequent stages of treatment. Because there are no significant chemical changes, the same organic substances are found in the process water as in wood. More than 40% of the DCS released from unbleached spruce thermomechanical pulping (TMP) are carbohydrates. In addition, lipophilic extracts (14%), watersoluble lignans (7%), and low molecular weight acids (2%) are released. The rest consists of, among others, lignin, bark derived phenols, proteins, colloidal fiber fines, and inorganic salts. The majority of carbohydrates dissolved from unbleached spruce TMP consists of acetylated galactoglucomannans (60%). In addition, smaller amounts of arabinogalactanes (11%), arabinoglucuronoxylans (2%), and pectins (2%) are dissolved.

In traditional mechanical pulping methods, production lines are generally integrated with paper manufacturing that uses process water, containing dissolved components obtained from the mechanical grinding process. Generally, the dissolved components are not removed; instead they are recycled in the process water circulation. Some of the DCS are removed from the process along with the paper, but other DCS remain in the circulation water. These remaining DCS can react with paper chemicals and cause technical problems. When water circulation is closed, various DCS are enriched into the water in various ways. The substances with lowest solubility and those that are most easily adsorbed by fibers are removed along with the paper. For example, the proportion of lignin and lipophilic extracts in the total amount of DCS decreases when the DCS level of the circulating water increases, but the proportional part of carbohydrates, instead, increases. In the further treatment of fibers, it can be technically difficult to use process water that contains dissolved and colloidal components. Process water can reduce the runnability of the paper machine or increase the organic loading of the process, whereby external purification is needed. Such methods of purification include evaporation, deposition, clarification, flotation or some filtration methods. The pure water obtained from concentration can be returned to circulation. Evaporation is a common method in the pulp industry but not so much in paper processes yet. The treatment of process water containing polymeric carbohydrates by concentration is difficult because of colloidal substances and viscous proper ties.

DESCRIPTION OF PRIOR ART

FI patent publication 85 041 suggests decomposition of ingredients dissolved or dispersed from paper pulp, with the aid of enzymes, by particularly adding enzymes that break down hemicellulose to the water circulation of a paper machine. The purpose was to improve infiltration from the pulp track formed on the wire and to improve the retention of fibers. FI patent publication 954377 describes the use of enzymes, e.g., hemicellulases, in detaching compounds derived from wood or coating which adhere to a moving member of the paper machine. FI patent publication 90 670 relates to hydrolyzing with pectinase the detrimental pectin dissolved from pulp during alkali treatment or peroxide bleaching, whereby the need to add cationic polymers is decreased. U.S. patent publication 5,415,735 suggests treatment of the glucomannans of the DCS by esterases to redeposit the glucomannans on the surface of the fibers and to reduce the concentration of dissolved substances. FI patent publication 93 230 deals with depositing resinous substances onto a fiber by hydrolyzing with hemicellulases the carbohydrates that are on top of colloidal pitch droplets in the process water, whereby the stability of the pitch droplets deteriorates and the resinous substances are deposited onto the surface of the fibers. However, none of the publications mentioned above tries to solve the problem with concentration of the process waters derived from pulping.

Terho and Malinen (1996) (Wet-End Chemistry in Closed-Cycle Papermaking. International Conference on New Available Techniques; 5th International Conference on New Available Techniques, 1. World Pulp and Paper Week (SPCI): 525(1996;SPCI): Paperchem AB16849) and Gullichsen (1993) (Towards the Nonpolluting Pulp Mill; General Aspects, EUCEPA International Environmental Symposium: Pulp and Paper Technologies for a Cleaner World (EUCEPA), Session: Plenary Lectures: 27–34 (1993:CTP) Dialog File: 240 Paperchem AB6714168) deal with concentrating the process water from mechanical 5 pulping by evaporation.

BRIEF SUMMARY OF THE INVENTION

The purpose of the present invention is to eliminate the drawbacks of known technology and to provide a new kind of method to enhance the concentration of DCS in the process waters derived from mechanical pulping.

In the process according to the invention, the concentration of DCS can be enhanced by using enzymes, whereby a greater amount of recyclable water can be separated from the concentrate. In this case, the circulation water coming to the paper machine contains a smaller amount of detrimental substances. The purpose of the invention in particular is to decrease the amount of waste water from pulping processes and paper machine circulation waters.

It is well-known that the amount of waste water from pulping processes could be decreased by concentrating the process water. However, when process water is concentrated, the viscosity of the process water tends to go up so high that concentration cannot be continued. By concentrating, a dry content of only 40% can be obtained, whereby it is not economic to burn the concentrate. In the process according to the invention, the increase in viscosity, when process water is concentrated, is prevented by using an enzymatic method or the viscosity of process water that has already been concentrated is reduced, whereby higher dry contents can be achieved as a consequence of concentration. With the aid of the process, dry contents of more than 40%, preferably more than 45%, more preferably more than 50%, and most preferably more than 60% can be achieved, whereby it is profitable to after-treat the concentrate by burning. Because their volumes decrease and their treatment either on dumping areas or by burning becomes easier, the process provides a more economic treatment for concentrates.

The invention provides considerable advantages. Therefore, it is possible to modify the DCS of process water by using enzymatic methods so that the process water can be concentrated by, for example, evaporating it into a high dry content without an increase in the viscosity of the process water, and the majority of the process water can be returned to circulation as pure water. After concentration, the dry content of the concentrate is preferably more than 60%. Because of the reduction in the volume of the concentrate, it is easier to process further. The concentrate can be burned or taken to a dumping area.

BRIEF DESCRIPTION OF THE DRAWINGS

In the following, the invention will be examined closer with the help of the following drawings.

DETAILED DESCRIPTION OF THE PREFERRED EMBODIMENTS

Figure 1:
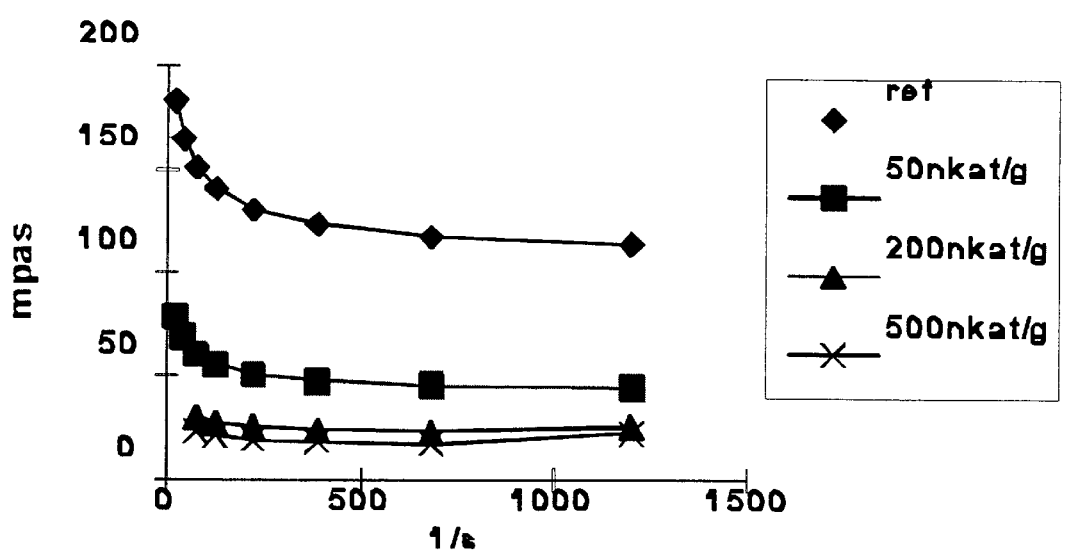
FIG. 1 is a diagrammatic presentation of the viscosity of TMP water as a function of a mannanase dosage. The effect of mannanase (50, 200, and 500 nkat/g, 2h, 30° C., 150 rpm) on the viscosity of the TMP concentrate is shown at various rotation velocities.

The carbohydrates that have dissolved into the process water from the wood consist of various hemicellulose compounds with molecular mass distributions within 3000–200 000. The majority consists of acetylated galactoglucomannan which, when concentrated, forms viscose, gelatinous solutions. In addition, small amounts of xylans consisting of xylose, arabinose and methyl glucuronic acid units, glucans consisting of glucose, and pectins consisting of galacturonic acid units are dissolved. The process according to the invention makes it possible to modify the DCS in the process water by using enzymatic methods so that the viscosity of the concentrated process water is reduced. In the enzymatic method, process water is treated with enzymes which have an effect on carbohydrates and which break down carbohydrate polymers so that their molecular weight is reduced. The released low-molecule water-soluble oligosaccharides no longer form viscose solutions. Typically, the enzymes that cause the desired effect are depolymerizing. Mannanases and endoglucanases are particularly preferred hydrolytic enzymes in this invention.

In the process according to the invention, enzymes are added in connection with concentration at either one or more stages before or during concentration. Due to the decrease in viscosity, concentration can be continued to attain a higher dry content than without enzyme treatment. Without enzyme treatment, process water can be concentrated to a dry content of about 40 to 50% maximum. By adding enzymes, concentration can be continued until burning the concentrate is economically profitable. According to the invention, the concentrate can be evaporated to a dry content of more than 45%, more preferably more than 50%, and most preferably more than 60%.

In the present invention, "process water" refers to the process water used in mechanical or chemi-mechanical pulping, containing carbohydrates dissolved from the pulp. Mechanical and chemi-mechanical pulping includes, for example, refiner mechanical pulping (RMP), pressurized refiner mechanical pulping (PRMP), thermomechanical pulping (TMP), groundwood (GW) pulping, pressurized groundwood (PWG) pulping, and chemithermomechanical pulping (CTMP).

In addition to pulp prepared by the above-mentioned processes, the invention can be applied to the circulation waters of high yield chemical pulp, such as kraftliner.

Process water comprises the internal circulation of a mechanical or a chemi-mechanical pulping process. Typically, such circulation can be obtained from the "brown water" obtained in connection with the water elimination of refined pulp. Thus we can generally state that the process water to be treated comprises waste water formed by the processes that increase the dry content of the raw material, the waste water having been obtained by, for example, applying pressure or by filtering or precipitating. The process water can also come from the washing phase of refined pulp. Correspondingly, it is possible to treat a water flow, such as brown water or the waste water from washing which is led from the mechanical or chemi-mechanical pulping process to a paper or board machine.

The process according to the invention can be used to treat concentrated or unconcentrated process water by enzymes that influence carbohydrates. Surprisingly, we noticed in connection with this invention that mannanases and endoglucanases worked extremely well in the process according to the invention. When conducting tests on pure enzymes, we observed that pure pectinase, xylanase or lipase did not cause a decrease in viscosity.

Enzyme preparations containing "mannanase and/or endoglucanase" refer to enzymepreparations containing enough mannanase and/or endoglucanase enzyme to reduce the viscosity of concentrated process water or to prevent the increase in viscosity when concentrating process water. According to a preferred embodiment of the invention, process water has first been concentrated to a dry content of more than 30%. The present invention allows the viscosity of concentrated process water to be reduced substantially—to levels of only one third of, or to as low as one tenth of the original viscosity of the concentrate. The amount of enzymes that is required to lower the viscosity of the concentrate or to prevent the increase in viscosity when process water is further concentrated corresponds, when counted as mannanase or endoglucanase activity, to 1–100000 nkat/g, preferably 20–1000 nkat/g, most preferably to 50–100 nkat/g of dry matter. By using the said amounts of enzyme, it is possible to prevent the increase in the viscosity of the concentrate to a dry content of 40–60%, preferably more than 60%, more preferably 60–70% or even higher when concentrating process water.

The enzymes that hydrolyze hemicellulose and/or cellulose: mannanase and endoglucanase, can come from any micro-organisms capable of producing these enzymes, such as mould fungi, particularly the fungus genera of Trichoderma, Aspergillus, Penicillium, Paecilomyces, Sclerotium, Sporotrichum, Thielavia, Polyporus, Tyromyces or bacteria, such as Bacillus or Streptomyces. However, the invention is neither limited to these enzyme sources nor any certain isolation method, but the enzymes can also be obtained by other means.

The "enzyme preparation" in this application refers to an enzyme product that is, according to the invention, capable of preventing an increase in viscosity when process water is concentrated or causes a decrease in the viscosity of concentrated process water, when previously concentrated process water is treated.

The term "enzyme preparation" in this application further refers to any product that contains at least one enzyme. Therefore, the enzyme preparation can be, for example, a cultured solution containing an enzyme or enzymes, an isolated enzyme or a mixture of two or more enzymes. "Mannanase" or "a mannanase enzyme preparation" or "endoglucanase" or "an endoglucanase preparation" refers to an enzyme preparation containing either one of the above-mentioned enzymes.

It is also possible to produce mannanase or endoglucanase by strains that have been genetically improved to produce these proteins in particular, or by other genetically improved host organisms to which the genes that code these proteins have been transferred. When the genes of a desired protein have been cloned, the protein or part of it can be produced in a desired host organism. The desired host can be Trichoderma, preferably Thichoderma reesei mould, a yeast, another mould, such as one from the Aspergillus genus, a bacterium or any other micro-organism which has genetics that are sufficiently well known. The mannanase or endoglucanase preparation can be the cultured solution of a genetically improved production strain or an enzyme preparation that is taken from it by purifying.

The mannanase and endoglucanase enzyme preparations are also available commercially, for example, the ECON-ASE enzyme preparations (Röhm Enzyme Finland Oy, Nurmiärvi).

Process water is treated with mannanase and/or endoglucanase enzymes at a temperature of 20–90° C., preferably 30–60° C. The treatment time is 10 min to 24 hours, preferably 0.5–2 hours.

Treatment of process water is carried out in a pH of 5–8 and, generally, the pH does not need to be adjusted.

NON-LIMITING EXAMPLES OF THE INVENTION

The following non-limiting examples illustrate the invention:

Example 1

Composition of Process Water of TMP Pulp

The chemical composition of the dry matter of process water used in thermomechanical pulping (TMP) of softwood was as follows:

| | |
|---|---|
| Gravimetric lignin | 7.4% of dry matter |
| Soluble lignin | 3.4% of dry matter |
| Lipophilic extracts | 1.2% of dry matter |
| Carbohydrates | 34.6% of dry matter |
| Lignans | 4.6% of dry matter |
| Ash | 30.5% of dry matter |

The composition of the carbohydrate fraction was as follows:

| | |
|---|---|
| Xylan | 0.8% of dry matter |
| Glucomannan | 20.9% of dry matter |
| Pectin | 0.6% of dry matter |
| Cellulose | 8.5% of dry matter |
| Arabinogalactan | 3.8% of dry matter |

Example 2

Treatment of Concentrated TMP Water with Mannanase

The dry content of TMP water concentrated by evaporation was 37% and the pH 5.8. The concentrate was treated with mannanase produced by the Trichoderma reesei mould (RUT-C-30) by using an enzyme dosage of 50–500 nkat/g per dry matter of the concentrate by slightly agitating (150 rpm) at 30° C. for 2 hours. A reference sample was incubated without the enzyme. After incubation, the viscosity was immediately measured with a Bohlin Visco 88 BV viscosimeter (Bohlin Reologi AB, Sweden) at various rotation velocities. The volume of the sample was 17 ml and the measuring head of the device C30.

The measuring temperature varied within 23.4–24.5° C. On the smallest enzyme dosage, 50 nkat/g, the viscosity decreased to less than half of the original, and on a dosage of 200 nkat/g to one fifth (25 M Pas) (FIG. 1).

Example 3

Treatment of Concentrated TMP Water with Endoglucanase I

Figure 2:
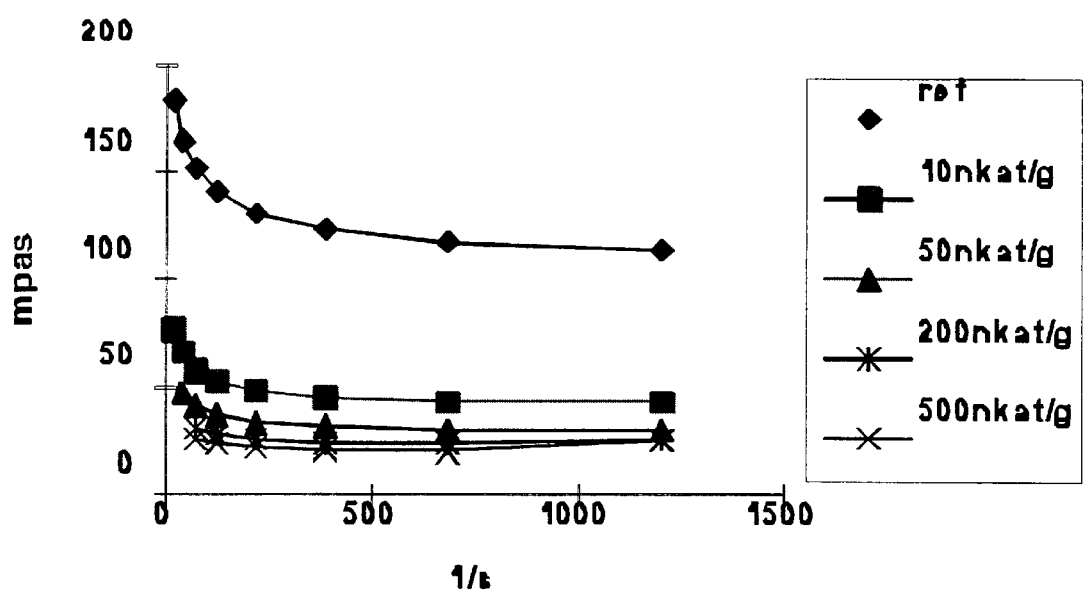
FIG. 2 is a diagrammatic presentation of the viscosity of TMP water as a function of a dosage of an endoglucanase I preparation. The effect of endoglucanase (EG I) (10, 50, 200, and 500 nkat/g, 2h, 30° C., 150 rpm) on the viscosity of the TMP concentrate is shown at various rotation velocities.

In accordance with Example 1, TMP concentrate was treated with an endoglucanase I preparation (EG I) produced by the Trichoderma reesei mould. EG I was efficient in reducing the viscosity. As small an amount as 50 nkat/g of endoglucanase reduced the viscosity to one fourth (29 M Pas) (FIG. 2).

Example 4

Treatment of Concentrated TMP Water with Endoglucanase II

Figure 3:
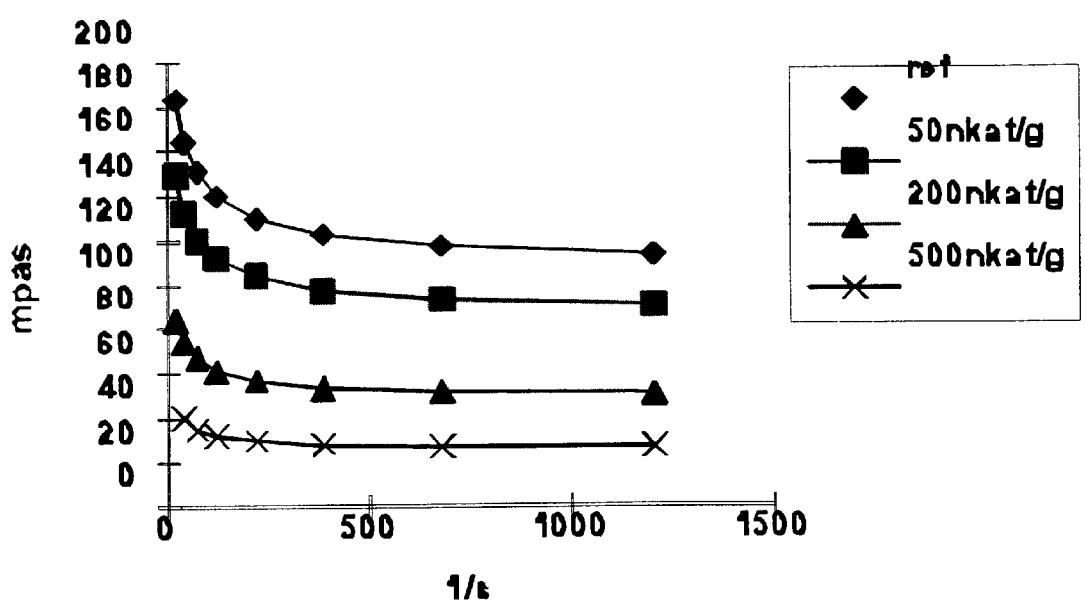
FIG. 3 is a corresponding representation of the effect of an endoglucanase II preparation on the viscosity of TMP water. The effect of endoglucanase (EG II) (50, 200, and 500 nkat/g, 2h, 30° C., 150 rpm) on the viscosity of the TMP concentrate is shown at various rotation velocities.

In accordance with Example 1, TMP concentrate was treated with an endoglucanase II preparation (EG II) produced by the Trichoderma reesei mould. A tenfold amount of the EG II (500 nkat/g) enzyme was needed compared to EG I to achieve the same reduction in viscosity (FIG. 3).

Example 5

Treatment of concentrated TMP water with an industrial cellulase enzyme

Figure 4:
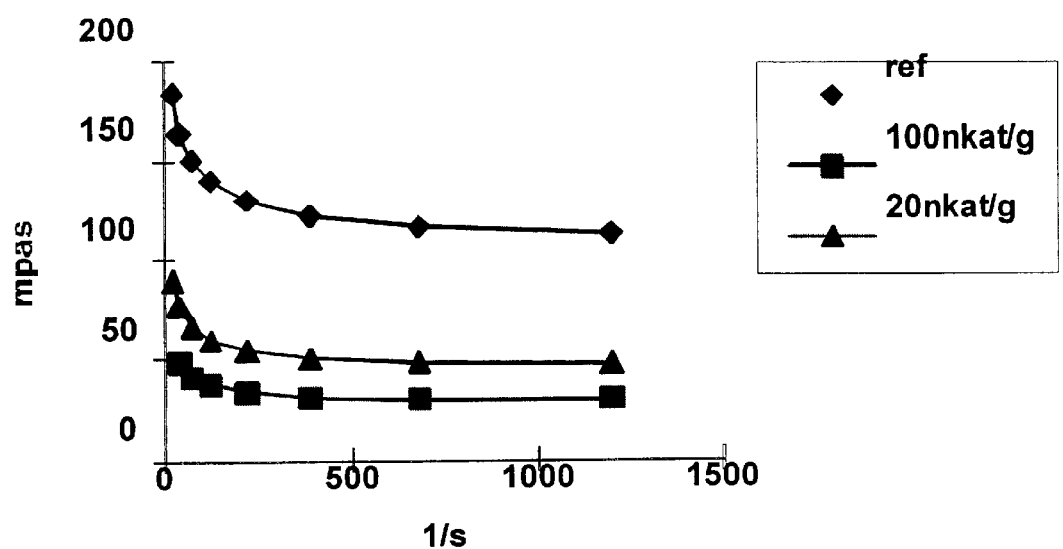
FIG. 4 shows the viscosity of TMP water as a function of a dosage of a commercial endo glucanase preparation. The effect of endoglucanase (Econase) (20 and 100 nkat/g, 2h, 30° C., 150 rpm) on the viscosity of the TMP concentrate is shown at various rotation velocities.

In accordance with Example 1, TMP concentrate was treated with a commercial industrial enzyme (Econase CE, Röhm Enzyme Finland Oy, Nurmijärvi) suitable for breaking down cellulose and hemicellulose. Because Econase contained endoglucanase and mannanase, the viscosity of the concentrate was reduced to one fourth with even a small amount of enzyme (100 nkat/g), as counted according to endoglucanase activity (FIG. 4).

Example 6

Treatment of Concentrated TMP Water with Industrial Pectinase Enzyme

Figure 5:
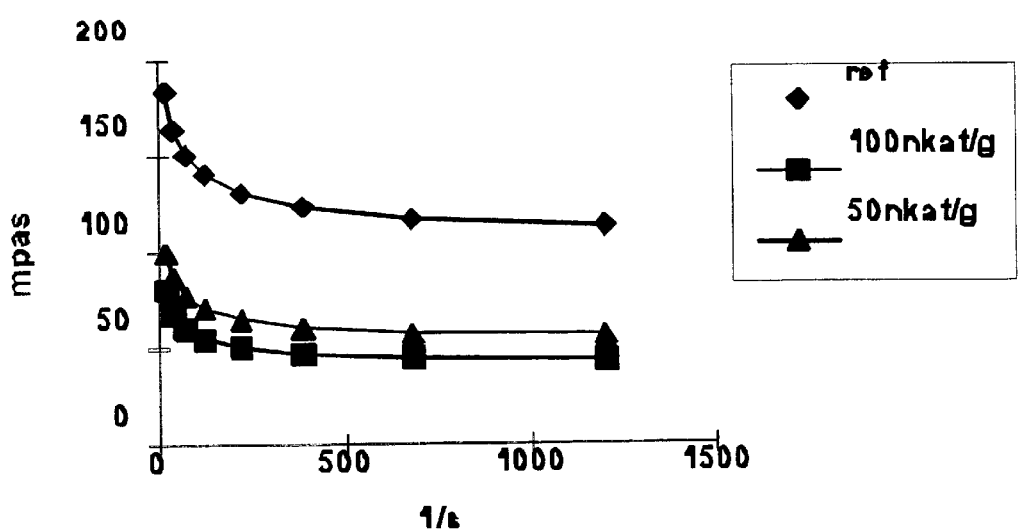
FIG. 5 shows the effect of pectinase on viscosity. The effect of pectinase (Pectinex Ultra) (50 and 100 nkat/g, 2h, 30° C., 150 rpm) on the viscosity of the TMP concentrate is shown at various rotation velocities.
Figure 6:
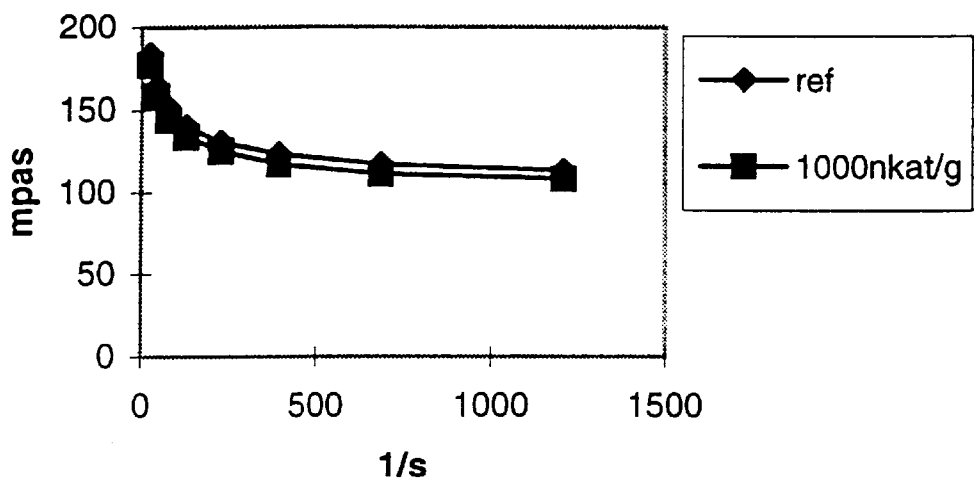
FIG. 6 shows the effect of pectinase and pectinmethyl esterase on viscosity. The effect of pectinase and pectinmethyl esterase (200 and 500 nkat/g, 2h, 300° C., 150 rpm) on the viscosity of the TMP concentrate is shown at various rotation velocities.

In accordance with Example 1, TMP concentrate was treated with a commercial pectinase preparation (Pectinex Ultra SP-L, Novo) which, in addition to endopolygalacturonase, also contained endoglucanase and mannanase. The enzyme dosage (100 nkat/g), as counted on the basis of endopolygalacturonase activity decreased the viscosity of the concentrate to nearly a third (FIG. 5).

Example 7

Treatment of Concentrated TMP Water with Pure Pectinase Enzyme

Figure 8:
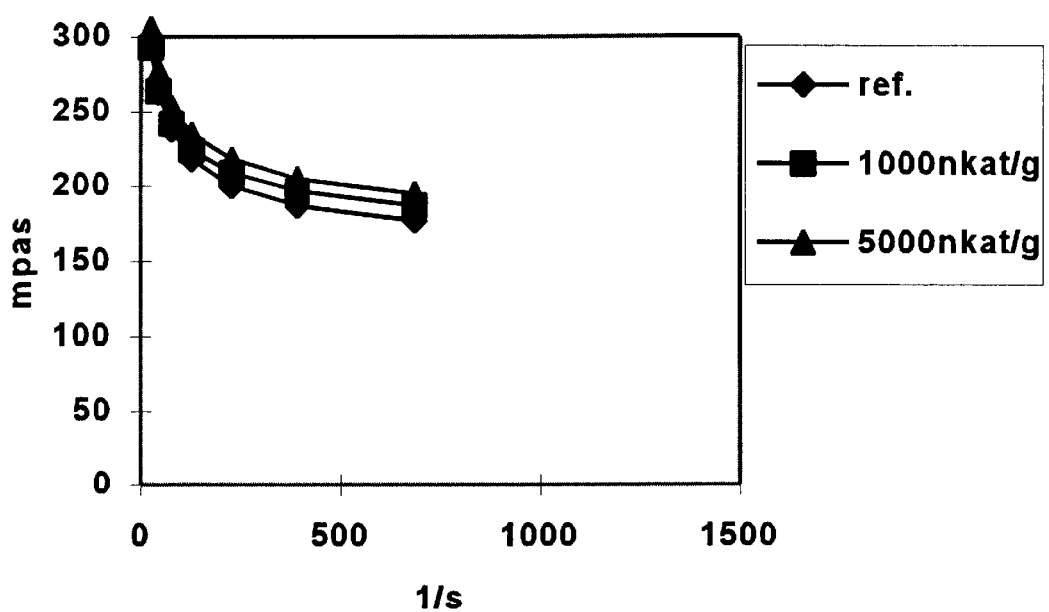
FIG. 8 shows the effect of lipase on viscosity. The effect of lipase (Resinase, Novo) (1000 and 5000 nkat/g, 2h, 30° C., 150 rpm) on the viscosity of the TMP concentrate is shown at various rotation velocities.

In accordance with Example 1, TMP concentrate was treated with a mixture of endopolygalacturonase (MegaZyme) that had been isolated from the *Aspergillus niger* mould and purified and pectinmethylic esterase (P 5400, Sigma), the mixture breaking pectin down into smaller oligosaccharides. Pure pectinase had no effect on the viscosity of TMP water; therefore, pectin is not a compound that increases the viscosity of this process water (FIG. 8).

Example 8

Treatment of Concentrated TMP Water with Pure Xylanase

Figure 7:
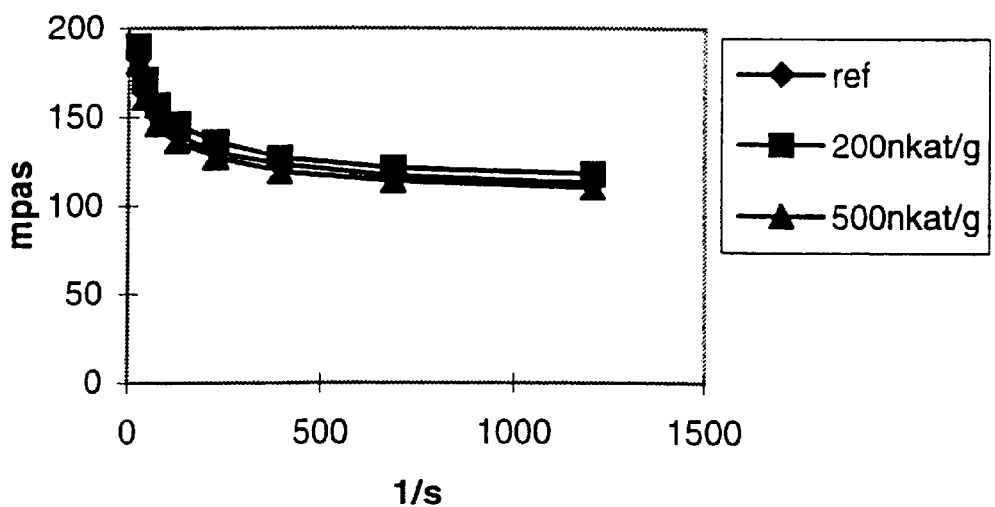
FIG. 7 shows the effect of xylanase on viscosity. The effect of pure xylanase Novo) (1000 nkat/g, 2h, 30° C., 150 rpm) on the viscosity of the TMP concentrate is shown at various rotation velocities.

In accordance with Example 1, TMP concentrate was treated with xylanase that had been isolated from the *Trichodernma reesei* mould and purified, and that decomposes xylan into smaller oligosaccharides. Pure xylanase had no effect on the viscosity of TMP water; therefore, xylan is not a compound that increases the viscosity of this process water (FIG. 7).

Example 9

Treatment of Concentrated TMP Water with Lipase Enzyme

In accordance with Example 1, TMP concentrate was treated with commercial lipase (Resinase A, Novo) that decomposes the triglycerides contained by extracts into free fatty acids and glycerol. The lipase had no effect on the viscosity of TMP water; therefore, the triglycerides of the extracts are not compounds that increase the viscosity of this process water (FIG. 8).

Example 10

Effect of Enzyme Treatment on Viscosity in Concentration of TMP Process Water Untreated TMP process water and TPM process water that had been pre-treated with mannanase and endoglucanase were concentrated into various dry contents. Water treated with an enzyme could be concentrated into higher dry contents than untreated water. The viscosity of the enzyme-treated water did not increase to a level that impedes concentration.

What is claimed is:

1. A process for concentrating the fiber derived dissolved and colloidal substances (DCS) of recyclable process water that comes from mechanical pulping, wherein the process water is subjected to following sequential treatment steps comprising:
   concentrating the process water one or more times;
   bringing the process water into contact with an enzyme preparation containing mannanase and/or endoglucanase activities at one or more optional stages;
   decreasing the viscosity of the concentrated process water and/or preventing an increase in the viscosity of the process water;
   further concentrating the process water;
   recirculating the majority of the process water to a paper manufacturing process as pure water;
   removing the remaining reduced volume of concentrate of dissolved and colloidal substances (DCS) for subsequent burning or dumping.

2. The process according to claim 1, characterized by first concentrating the process water from the pulping process to a dry content of more than 30%, and then bringing it into contact with an enzyme preparation causing a decrease in the viscosity of concentrated process water and/or preventing an increase in the viscosity of the concentrated process water when the process water is further concentrated.

3. The process according to claim 1, characterized by reducing, with the aid of the enzyme preparation, the viscosity of the of the process water to levels of one third, to as low as one tenth of that in the original concentrate.

4. The process according to claim 1, characterized by rendering, by means of the enzyme treatment and further concentration, the process water to a dry content of more than 45%.

5. The process according to claim 1, characterized by enabling the ready after-treatment of the concentrate by, for example, burning, or transporting to a dumping area.

6. The process according to claim 1, characterized by using an enzyme preparation containing depolymerizing enzymes.

7. The process according to claim 1, characterized by treating process water that comes from all known commercially practiced mechanical pulping processes including thermomechanical pulping (TMP), pressurized groundwood pulping (PGV), groundwood (GV) pulping, chemi-thermomechanical pulping (CTMP), refiner mechanical pulping (RMP), pressurized refiner mechanical pulping (PRMP), or kraftliner.

8. The process according to claim 1, characterized by treating the process water with an amount of enzyme preparation which, when counted as mannanase or endoglucanase activity, corresponds to 1–100000 nkat/g of dry matter.

9. The process according to claim 1, characterized by treating the process water with enzymes at a temperature of 20–90° C.

10. The process according to claim 1, characterized by treating the process water with enzymes for 10 min to 24 hours.

11. The process according to claim 1, characterized by treating the process water with enzymes at an acidity of 5–8.

12. The process according to claim 1, characterized by using in the enzyme preparation, mannanase and/or endoglocanase that come from moulds selected from the group consisting of Trichoderfia, Aspergillus, Penicillium, Paecilomyces, Sclerotium, Sporotrichum, Thielavia, Polyporus and Tyromyces.

13. The process according to claim 12, characterized by using in the enzyme preparation, mannanase and/or endoglocanase that come from the fungus genera Trichoderma or Aspergillus.

14. The process according to claim 1, characterized by using in the enzyme preparation, mannanase and/or endoglocanase that come from bacteria such as Bacillus or Streptomyces.

15. The process according to claim 1, characterized by first concentrating the process water from the pulping process to a dry content of more than 40%, and then bringing it into contact with an enzyme preparation causing a decrease in the viscosity of concentrated process water and/or preventing an increase in the viscosity of the concentrated process water when the process water is further concentrated.

16. The process according to claim 1, characterized by rendering, by means of the enzyme treatment and further concentration, the process water to a dry content of more than 50%.

17. The process according to claim 1, characterized by rendering, by means of the enzyme treatment and further concentration, the process water to a dry content of more than 60%.

18. The process according to claim 1, characterized by treating the process water with an amount of enzyme preparation which, when counted as mannanase or endoglucanase activity, corresponds to 20–1000 nkat/g of dry matter.

19. The process according to claim 1, characterized by treating the process water with enzymes at a temperature of 30–60° C.

20. The process according to claim 1, characterized by treating the process water with enzymes for 0.5–2 hours.

* * * * *